Oct. 18, 1966 K. C. GOULDING 3,279,797
MAGAZINE SPINDLES FOR RECORD PLAYERS
Filed July 27, 1964 3 Sheets-Sheet 1
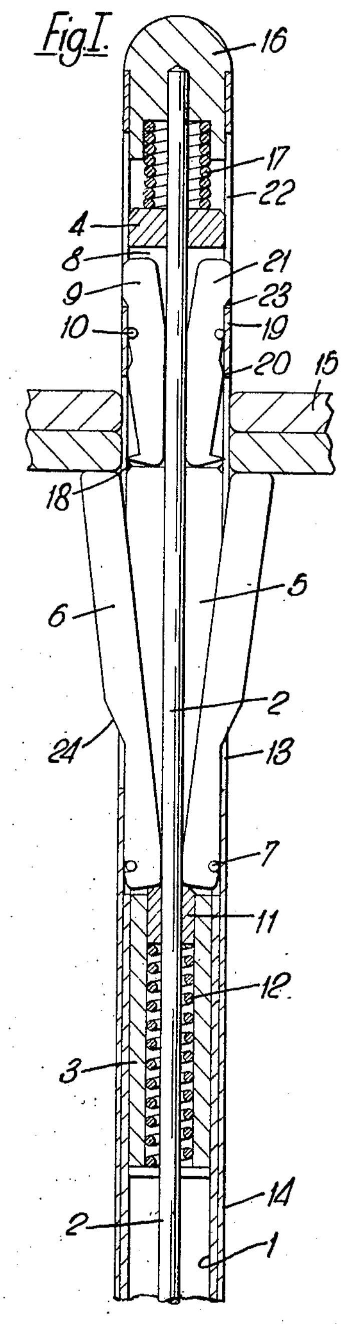
Fig. I.
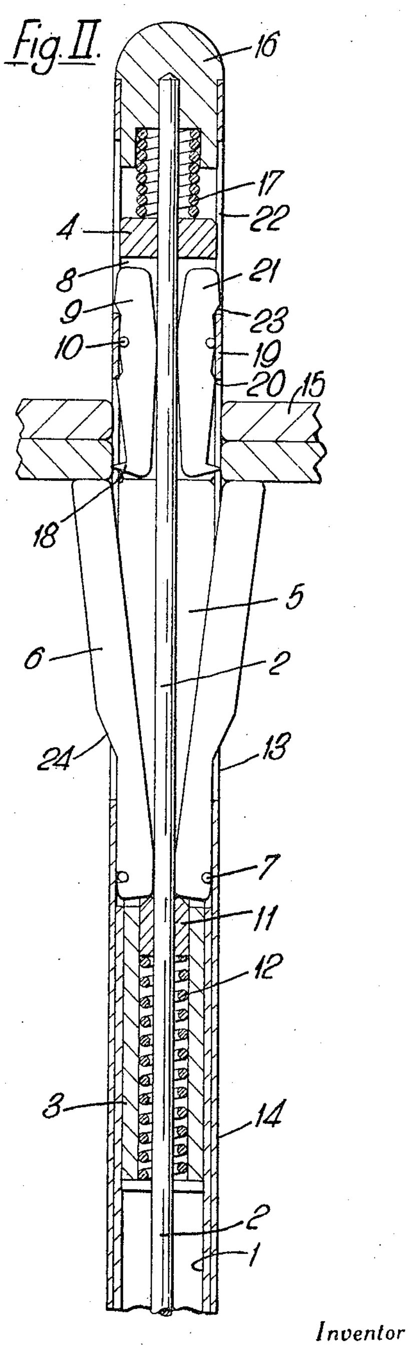
Fig. II.
Inventor
KENNETH C. GOULDING
By
Holcombe, Wetherill + Brisebois
Attorneys MAGAZINE SPINDLES FOR RECORD PLAYERS
Filed July 27, 1964 3 Sheets-Sheet 2
Fig. III
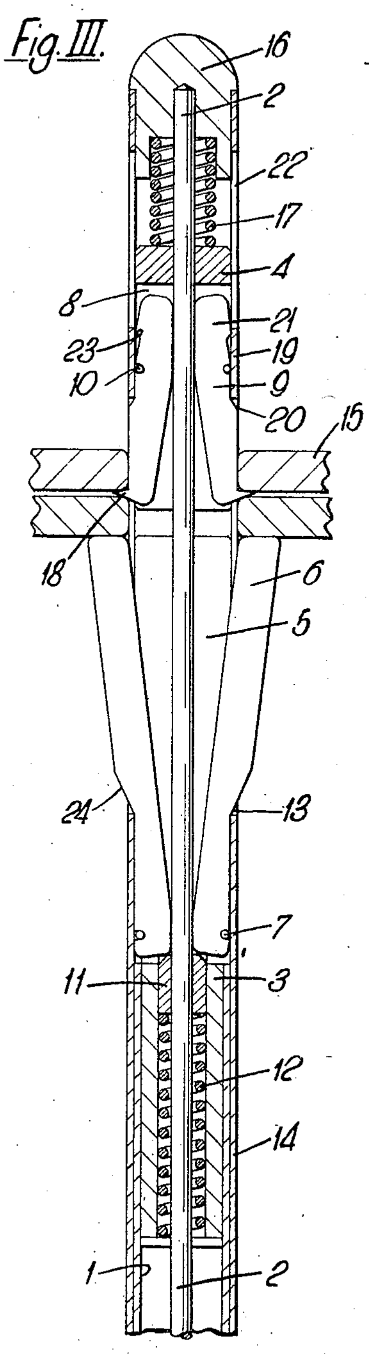
Fig. IV
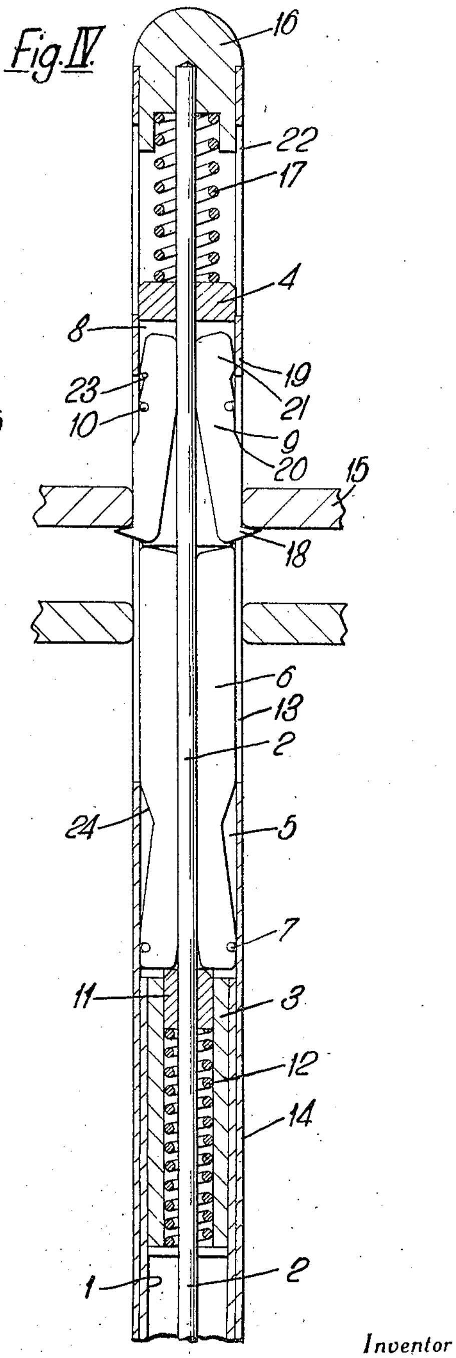
Inventor
KENNETH C. GOULDING
By
Holcombe, Wetherill & Brisebois
Attorneys MAGAZINE SPINDLES FOR RECORD PLAYERS
Filed July 27, 1964 3 Sheets-Sheet 3
Fig. V
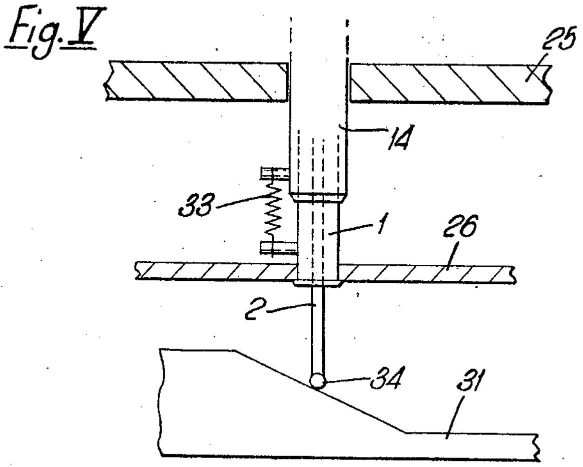
Fig. VI
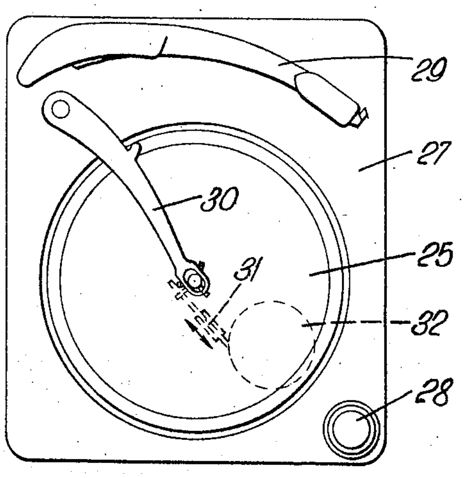
*Inventor*
KENNETH C. GOULDING
*By*
Holcombe, Wetherill & Brisebois
*Attorneys*

United States Patent Office 3,279,797
Patented Oct. 18, 1966

3,279,797
MAGAZINE SPINDLES FOR RECORD PLAYERS
Kenneth Charles Goulding, Barking, Essex, England, assignor to The Magnavox Electronics Company, a British company
Filed July 27, 1964, Ser. No. 385,432
Claims priority, application Great Britain, Aug. 2, 1963, 30,765/63
4 Claims. (Cl. 274—10)

One kind of magazine spindle for automatic record changing gramophones which is commonly known as an umbrella spindle, has a primary support consisting of a number of fingers projecting from the periphery of the spindle rather like the supporting struts of an umbrella. Whilst one record is being played, the remainder of the stack of records is supported on the primary support on the spindle. When the next lowermost record in the stack is to be played, a secondary support comes into action and supports all the records in the stack except the lowermost one. The primary support is then withdrawn within the spindle so that the lowermost record falls down the spindle and onto the turntable. When all the records in the stack have been played, the whole stack is lifted from the turntable up off the spindle and as the stack reaches the fingers it rides over them and forces them to retract into the spindle.

In accordance with the present invention, such a spindle comprises a central core having three or more radical slots, a number of fingers mounted in the slots and forming the primary support, a number of retaining pawls mounted in the slots and forming the secondary support and an operating sleeve which surrounds the core and has slots through which the fingers and pawls can project outwards, the arrangement being such that the operating sleeve reciprocates upwards and downwards once in each operating cycle and when it is moved upwards it first engages cam surfaces on the retaining pawls and causes the pawls to move outwards and support all the records in the stack except the lowermost one and then engages cam surfaces on the fingers and causes the fingers to be withdrawn into the core against spring action so that the lowermost record in the stack is unsupported and falls down the spindle onto the turntable, subsequent downward movement of the operating sleeve causing the retaining pawls to return to their retracted position and the fingers to their projecting position.

The core may be made in two parts with the retaining pawls mounted in slots in an upper part and the fingers mounted in slots in the lower part. The radial slots in the two parts of the core need not necessarily be in alignment with one another although it is preferred if they are because in this case both the fingers and the retaining pawls can project through the same set of slots in the operating sleeve. When the core is made in two parts in this way, the operating sleeve may be arranged to urge the upper part of the core and with it the retaining pawls upwards against spring action away from the lower part of the core as it rocks the retaining pawls to their projecting position. In this way slight misalignments in the stack of records or variations in the thicknesses of the records can be allowed for if the parts of the retaining pawl which are to engage beneath the records above the lowermost one in the stack are first moved outwards into engagement with the edge of the central hole in the lowermost record and are then moved upwards by the operating sleeve until they engage between the lowermost record and the one above it before the fingers are retracted and the lowermost record is dropped. This can be arranged for example, by mounting the upper part of the core on a central rod so that it has a limited vertical sliding movement relatively to the lower core part and providing a recess in the retaining pawls into which a part of the operating sleeve fits so that when the operating sleeve is raised the pawls and the upper part of the core with them is raised with the sleeve until the parts of the retaining pawls engage between the lowermost record and the one above whereupon the parts of the operating sleeve ride out of the recesses in the retaining pawls and over the cam surfaces on the pawls so that the pawls are rocked into their fully projecting positions. The spring which urges the upper part of the core to its lowermost position may be a helically coiled compression spring trapped between the top of the upper part of the core and a plug in the upper end of the operating sleeve.

Both the retaining pawls and the fingers may be located axially in the slots in the core by spring circlips which seat in annular grooves in the core and corresponding notches in the retaining pawls or fingers. These spring circlips then allow the retaining pawls and fingers to rock between positions in which they are retracted within the slots in the core and their projecting positions but prevent them from moving axially upwards or downwards relatively to the core.

One example of an automatic record changing gramophone having a spindle constructed in accordance with the present invention is illustrated in the accompanying drawings, in which:

FIGURES I to IV are vertical sections on semi-planes meeting along the centre line of the spindle at 120° to one another, and showing successive steps in the operating cycle of the spindle;

FIGURE V is a diagrammatic side view of the mechanism for raising and lowering parts of the spindle; and FIGURE VI is a plan view of the gramophone.

The spindle comprises a tube 1 and a coaxial rod 2 both of which pass down through the centre of a turntable 25 of the gramophone where the tube 1 is rigidly secured to a framework 26 of the gramophone. Fixed within and projecting upwards out of the tube 1 is the lower part 3 of an annular core. An upper part 4 of the core is free to slide upwards and downwards on the rod 2 above the lower part of the core. The lower part 3 of the core is formed with three equally spaced radial slots 5 in each of which is mounted a supporting finger 6. The three fingers 6 are retained in position by a spring circlip 7 which seats in an annular groove in the core and in notches in the lower parts of the fingers. The upper part 4 of the core is also formed with three equally spaced radial slots 8 which are in alignment with the slots 5. The slots 8 each contain a retaining pawl 9 which, like the fingers 6, are retained in position by a spring circlip 10. The spring circlips 7 and 10 form fulcrums about which the fingers 6 and the retaining pawls 9 respectively can rock. The lower part of the bore of the lower core part 3 is enlarged and an annular plunger 11 slides within the annular space between the lower part of the core 3 and the rod 2. Beneath the plunger in the same annular space is a helically coiled compression spring 12 which urges the plunger upwards into engagement with the extreme inner parts of the lower edges of the fingers 6 so that these fingers are urged to their fully projecting position shown in FIGURES I and II in which they project out from the slots 5 one through each of three slots 13 formed in an operating sleeve 14 which surrounds and is reciprocable upwards and downwards around the core 3 and 4. In this position the fingers 6 form a primary support for a stack of records 15 on the spindle and yet are firmly supported throughout most of their length by the sides of the slots 5 and the edges of the slots 13.

The sleeve 14, which together with the rod 2 is reciprocable under the control of a change cycle mechanism of the gramophone illustrated in more detail in FIGURE V, is closed at its upper end by a plug 16. A helically coiled compression spring 17 is trapped between the end of a recess in the plug 16 and the upper surface of the core part 4 so that this part of the core is urged downwards into engagement with the lower core part 3 as shown in FIGURES II and IV. In the rest position horizontal knife edges 18, one at the bottom of each retaining pawl 9 are held retracted within the slots 8 because a portion 19 of the operating sleeve overlies a projecting edge portion 20 on each of the pawls and the heads 21 of the pawls are able to enter another series of subsidiary slots 22 which are in alignment with the slots 13 in the operating sleeve 14.

At the beginning of a change cycle, the operating sleeve 14 begins to rise and as it does so the portion 19 of the operating sleeve tends to ride out of a recess in each of the pawls 9 and up an inclined surface 23 thus causing the pawls to rock about the circlip 10 so that the knife edges 18 move outwards through the slots 13. As will be apparent in FIGURE III this rocking movement of the pawls 9 is almost immediately stopped because the knife edges 18 come up against the wall of the central hole in the lowermost record of the stack 15. By this time the portion 19 of the operating sleeve has not moved completely out of the recess in each of the pawls 9 and the pawls 9 and the upper core part 4 are thereafter raised with the operating sleeve against the action of the compression spring 17. This continues until, as shown in FIGURE III, the knife edges 18 engage between the lowermost record and the one but lowermost record in the stack 15. The force of the spring 17 provides sufficient reaction to prevent further upward movement of the core part 4 and the retaining pawls 9 so that the portion 19 of the operating sleeve 14 then completes its movement in riding up the cam surface 23 on the pawls, the pawls 9 complete their rocking movement about the circlip 10, and the knife edges 18 are forced between the lowermost and one but lowermost records in the stack. All the records above the lowermost one are then supported by the secondary support provided by the retaining pawls. Further upward movement of the operating sleeve 14 causes the part of the sleeve immediately beneath the slots 13 to engage and ride up inclined cam surfaces 24 on each of the fingers 6 so that the fingers 6 are forced to rock about the circlip 7 until, as shown in FIGURE IV, they are fully retracted within the core part 3. The lowermost record in the stack is then unsupported and falls down the outside of the operating sleeve 14 onto the turntable 25.

As the operating sleeve is subsequently retracted downwards again, the fingers 6 are first released by the sleeve and forced outwards by the action of the spring 12 on the plunger 11. At the same time the sleeve brings the pawls 9 down with it until the rest of the stack is gently deposited on the primary support formed by the fingers 6. At this time the core part 4 comes to rest on the upper end of the core part 3 so that further downward movement of the sleeve 14 causes the portion 19 to override the cam projections 20 on the pawls and hence the knife edges to be retracted within the core part 4 again.

When it is subsequently necessary to lift the stack of records 15 off the turntable 25, they are simply lifted up off the spindle. Since the spindle is in its rest position, the retaining pawls 9 are already retracted within the core and as the records are lifted upwards they engage with the cam surfaces 24 on the fingers 6 and cause these fingers to be retracted against the action of the spring 12 and the circlip 7 into the lower part of the core. The fingers 6 of course immediately spring outwards again under the action of the spring 12 and are ready to receive a new stack of records over the top of the spindle.

As shown in FIGURE VI, the gramophone comprises a spring loaded platform 27 which carries a combined on/off switch and control knob 28, a pick-up arm 29, the turntable 25 and a stabilising arm 30 for maintaining the records horizontally on the spindle. The mechanism for raising and lowering the operating sleeve 14 consists of a horizontally moveable inclined cam 31 which is moved backwards and forwards by a control disc 32 having cam grooves in its surface. The disc 32 rotates through 360° and the cam 31 moves backwards and forwards once in each record change cycle in a conventional manner.

The sleeve 14 is urged downwards by means of a helically coiled tension spring 33 and the rod 2 carries a roller 34 at its lower end resting on the cam 31. The operating rod 14 is raised at the beginning of a change cycle upon movement of the cam 31 to the right in FIGURE V. This causes the roller 34 to ride up the inclined surface so that the rod 2 rises axially through the tube 1 and core 3, 4. The movement is transmitted through the cap 16 to the operating rod 14 which rises against the action of the spring 33. Upon subsequent leftward movement of the cam 31, as seen in FIGURE V, the roller 34 rides down the inclined surface once again as the combined action of gravity and the spring 33 cause the sleeve 14 and rod 2 to drop axially through the tube 1 and core 3, 4 once again.

The change cycle may be brought about manually instead of automatically by gripping the top of the operating sleeve 14 and raising it slowly upwards and downwards again. This has exactly the same effect as if the operating sleeve and rod 2 were pushed and withdrawn downwards again from beneath the turntable 25.

I claim:

1. In an automatic record changing phonograph having a mechanism which brings about a record change cycle the improvement which comprises a magazine spindle including a central core, wall portions of said core defining at least three spaced radial slots therein, at least three fingers having inner and outer ends, means mounting said inner ends each in a different one of said slots whereby said outer ends project from said slots and together form a primary support for a stack of records on the spindle, at least three retaining pawls mounted each in a different one of said slots whereby said pawls are adapted to extend from said slots to form a secondary support for all the records in said stack except the lowermost record when said primary support is withdrawn to allow the lowermost record to fall, an operating sleeve which is slidable axially around said core, parts of said sleeve defining slits therein for projection of said fingers and said pawls therethrough, first cooperating cam means on said sleeve and said retaining pawls, second cooperating cam means on said sleeve and said fingers, and an operating mechanism for reciprocating said sleeve along said core in such a way that said operating sleeve reciprocates upwards and downwards once in each operating cycle and when said sleeve is moved upwards said first cam means cause said pawls to move outwards and support all the records in said stack except the lowermost one whereupon said second cam means cause said fingers to be withdrawn into said core so that the lowermost record in said stack is unsupported and falls down the spindle on the turntable, subsequent downward movement of said operating sleeve causing said returning pawls to return to their retracted position and said fingers to their projecting position.

2. The invention according to claim 1, wherein said core is formed by upper and lower core parts, said retaining pawls being mounted in said upper core part and said inner ends of said fingers being mounted in said lower core part.

3. The invention according to claim 2, further comprising spring means urging said upper core part downwards into engagement with said lower core part whereby upon raising of said operating sleeve, said first cam means urges said upper core part and with it said retaining pawls upwards against said spring action away from said lower core part as said retaining pawls are rocked to their projecting position so that said retaining pawls are first moved outwards into engagement with the edge of the central hole in the lowermost record in said stack and are then moved upwards by said operating sleeve until said retaining pawls engage between the lowermost record and the one above it before said fingers are retracted and the lowermost record is dropped.

4. The invention according to claim 1, wherein said means mounting said inner ends of said fingers in said slots comprises a spring circlip and parts both of said core and said fingers defining an annular groove and notches respectively for seating said circlip.

References Cited by the Examiner

UNITED STATES PATENTS

| | | | |
|---|---|---|---|
| 2,689,735 | 9/1954 | Morrison | 274—10 |
| 2,981,953 | 4/1961 | Hansen | 274—10 |
| 3,046,021 | 7/1962 | Perge | 274—10 |

NORTON ANSHER, *Primary Examiner.*